United States Patent [19]
Sheffield

[11] Patent Number: 5,356,284
[45] Date of Patent: Oct. 18, 1994

[54] STACK MOLD WITH SPRING LOADED BLOW OFF PIN

[75] Inventor: James Sheffield, Aliston, Canada

[73] Assignee: Izon Industries Inc., Brampton, Canada

[21] Appl. No.: 723,601

[22] Filed: Jul. 1, 1991

Related U.S. Application Data

[63] Continuation-in-part of Ser. No. 463,542, Jan. 11, 1990, abandoned, which is a continuation of Ser. No. 193,605 May 13, 1988, abandoned.

[51] Int. Cl.$^5$ .................. B29C 45/40; B29C 45/43
[52] U.S. Cl. .................. 425/556; 425/422; 425/437; 425/444; 249/67; 249/68
[58] Field of Search .................. 249/66 A, 66 C, 67, 249/68; 425/556, 437, 444, DIG. 102, 554, 422

[56] References Cited

U.S. PATENT DOCUMENTS

| | | | |
|---|---|---|---|
| 1,930,815 | 10/1933 | Lund | 249/68 |
| 3,363,040 | 1/1968 | Aoki | 249/68 |
| 3,963,209 | 6/1976 | Muller | 249/65 |
| 4,050,666 | 9/1977 | Van Tichelt | 249/68 |
| 4,452,420 | 6/1984 | Lundquist | 249/68 |
| 4,653,997 | 3/1987 | Sheffield et al. | 425/556 |
| 4,710,124 | 12/1987 | Harrison | 249/68 |

Primary Examiner—Khanh Nguyen

[57] ABSTRACT

The present invention provides a mold with gas ejection of pieces formed in the mold. The mold includes a female body part and a male body part. The male body part includes a male molding surface with a surrounding plastic injection shut off face and a reciprocable gas controlling blow off pin slideably trapped within a pin recess at the shut off face. The pin has an enlarged bottom portion and a narrowed upper portion with a gas passage starting upwardly through the lower bottom portion into the upper portion and opening sideways through the pin which has a solid top surface above the sideways opening. The pin receiving recess has an undercut configuration including a small diameter upper region and a larger diameter base region with clearance for sliding of the pin in the recess. The clearance is at a minimum near the solid top surface of the pin and increases downwardly from the upper to the lower portion of the pin. The mold further includes a spring fittable chamber beneath and opening into the pin receiving recess. The spring fittable chamber has a diameter less than the bottom portion of the pin to prevent downward movement of the pin into the spring fittable chamber.

1 Claim, 3 Drawing Sheets

STACK MOLD WITH SPRING LOADED BLOW OFF PIN

This is a continuation-in-part application of U.S. patent application Ser. No. 07/463,542 filed Nov. 11, 1990, now abandoned which is a continuation of U.S. patent application Ser. No. 07/193,605 filed May 13, 1988 now abandoned.

FIELD OF THE INVENTION

The present invention relates to a mold with a gas ejection system and in particular, a reciprocable pin as part of the gas ejection system.

BACKGROUND OF THE INVENTION

The use of gas under pressure for ejecting pieces from molds has become more and more popular in view of the problems encountered with mechanical ejection systems. In particular, mechanical ejection systems produce unwanted pressure on the pieces during ejection and can therefore damage these pieces. The full description of these problems is found in my earlier issued U.S. Pat. No. 4,653,997 dated Mar. 31, 1987 and its corresponding Canadian counterpart.

In the above referenced patents, I used gas pressure to lift the pin to an operating position. In order to minimize the loss of pressure, I provide an O-ring around the enlarged base of the pin which seats on and rides against the pin recess wall so that the gas cannot escape upwardly other than through the gas passage in the pin. This tight fitting at the base of the pin then requires a high gas pressure to lift the pin. As soon as the pin has been lifted, the high gas pressure is maintained producing a high pressure jet directed at the male molding surface which may, for example, with smaller formed pieces result in an extremely abrupt release of those pieces from the male molding surface.

SUMMARY OF THE PRESENT INVENTION

The present invention provides a mold with gas ejection using a blow off pin where that pin is readily lifted to the operating position and where the pressure of the gas blow off can be controlled from a higher to a lower pressure according to the gas assist required for removing the formed piece from the male mold surface.

More particularly, the present invention provides a mold with gas ejection of pieces formed in the mold where the mold comprises a female body part and a male body part. The male body part includes a male molding surface with a surrounding plastic injection shut off face and a reciprocable gas controlling blow off pin slideably trapped within a pin recess at the shut off face. The pin itself has an enlarged bottom portion and a narrowed upper portion with a gas passage starting upwardly through the lower bottom portion into the upper portion and opening sideways of the pin so that the pin has a solid top surface. The pin receiving recess has an undercut configuration including a small diameter upper region and a larger diameter base region with clearance for sliding of the pin in the recess. The clearance is at a minimum near the solid top surface of the pin and increases downwardly from the upper to the lower portion of the pin. The tight tolerance at the upper portion of the pin prevents sideways movement of the pin to the extent that the outer walls of the bottom of the pin avoid contact with the base region of the pin recess.

As a result of the tight tolerance at the upper end of the pin, there is drag on the pin as it moves up to its operating position. As a result, it is desirable to have a spring assist rather than using the gas pressure for lifting of the pin. Accordingly, and in order to meet different operating demands, the mold is further provided with a spring fittable chamber beneath and opening upwardly into the pin receiving recess. This spring fittable chamber has a diameter less than the bottom portion of the pin to prevent downward movement of the pin into the spring fittable chamber.

When the mold is fitted with a spring, the enlarged bottom portion of the pin provides a seat for receiving the spring which then pushes up on the pin. With the above set up, the pressure of the gas fed through the pin can be controlled from a higher to a lower pressure according to the degree of assist required from the blow off pin in removing the formed pieces from the male molding surface.

BRIEF DESCRIPTION OF THE DRAWINGS

The above as well as other advantages and features of the present invention will be described in greater detail according to the preferred embodiments of the present invention in which.

DETAILED DESCRIPTION ACCORDING TO THE PREFERRED EMBODIMENTS OF THE PRESENT INVENTION:

My earlier United States and Canadian Patents discuss the use of gas ejection in molds. However, one of the problems encountered with gas ejection is the flowing of plastic material into and blocking the gas ejection vents resulting in down time for cleaning of the vents. According to my earlier patents, I therefore developed a pin with a gas passage which is hidden from the flashing plastic when the mold is closed and which is moved to an operating position by gas pressure when the mold is opened.

Figure 1:
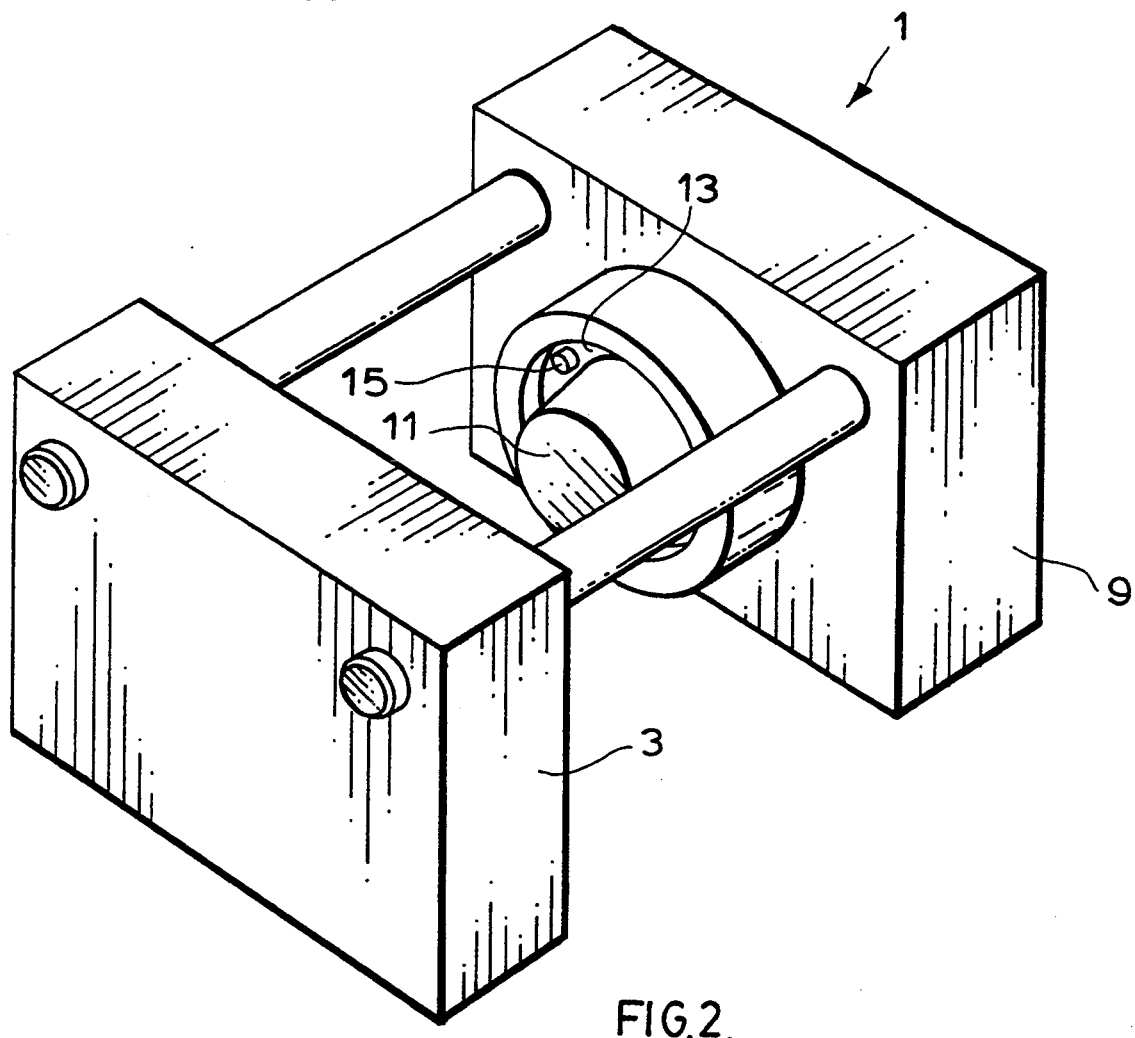
FIG. 1 is a perspective view of a mold in the open position using a blow off pin according to a preferred embodiment of the present invention.
Figure 2:
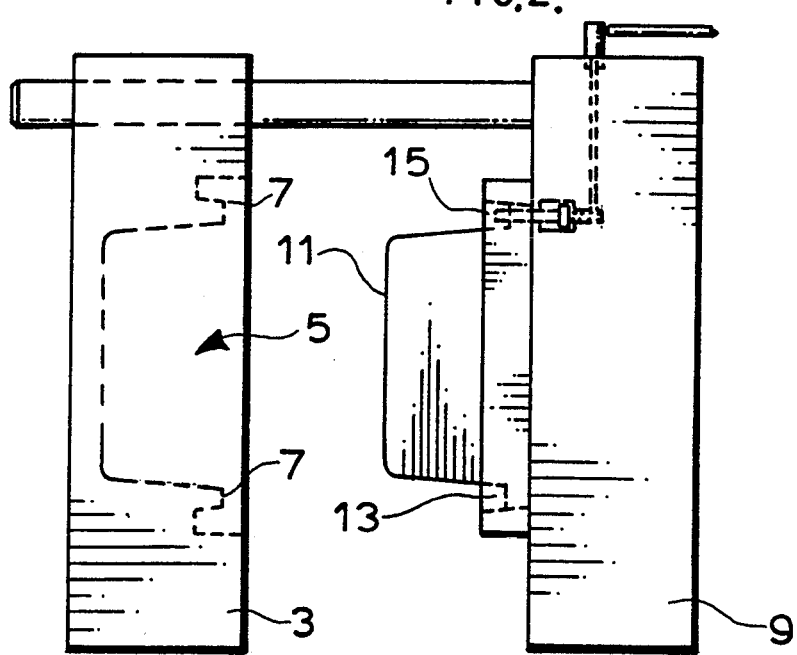
FIG. 2 is a sectional view through the mold of FIG. 1.
Figure 3:
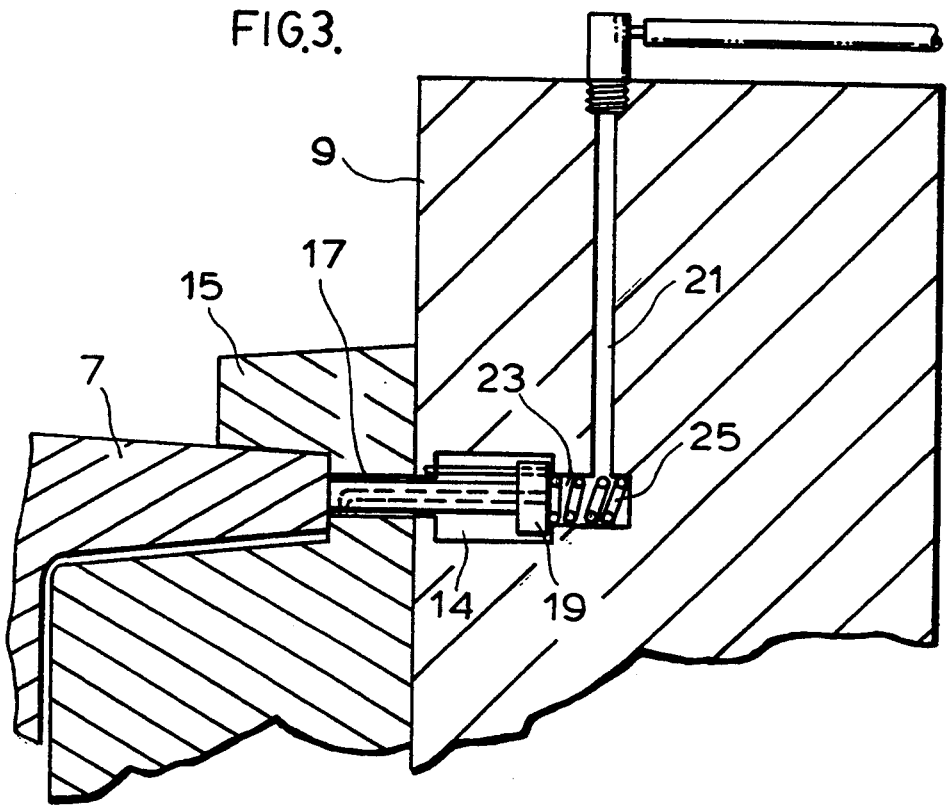
FIG. 3 is a sectional view in the area of the blow off pin of the mold on FIGS. 1 and 2 when in the closed position.
Figure 4:
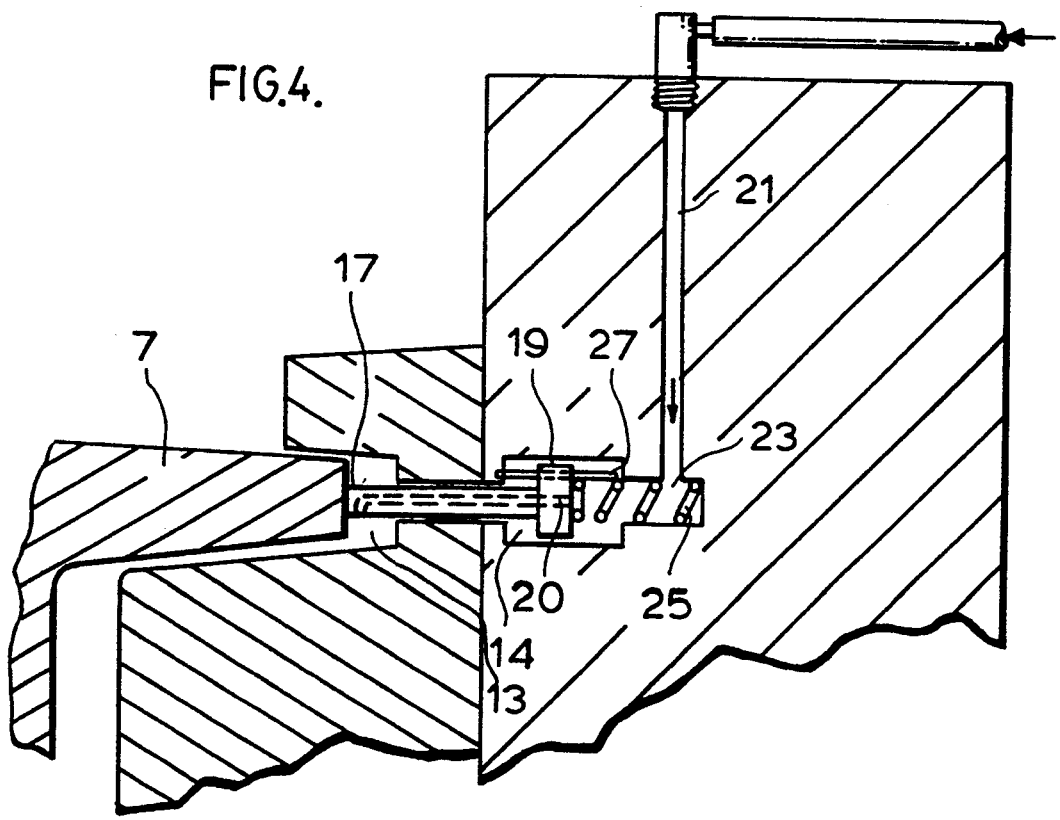
FIG. 4 is a view similar to FIG. 3 showing the opening of the mold.
Figure 5:
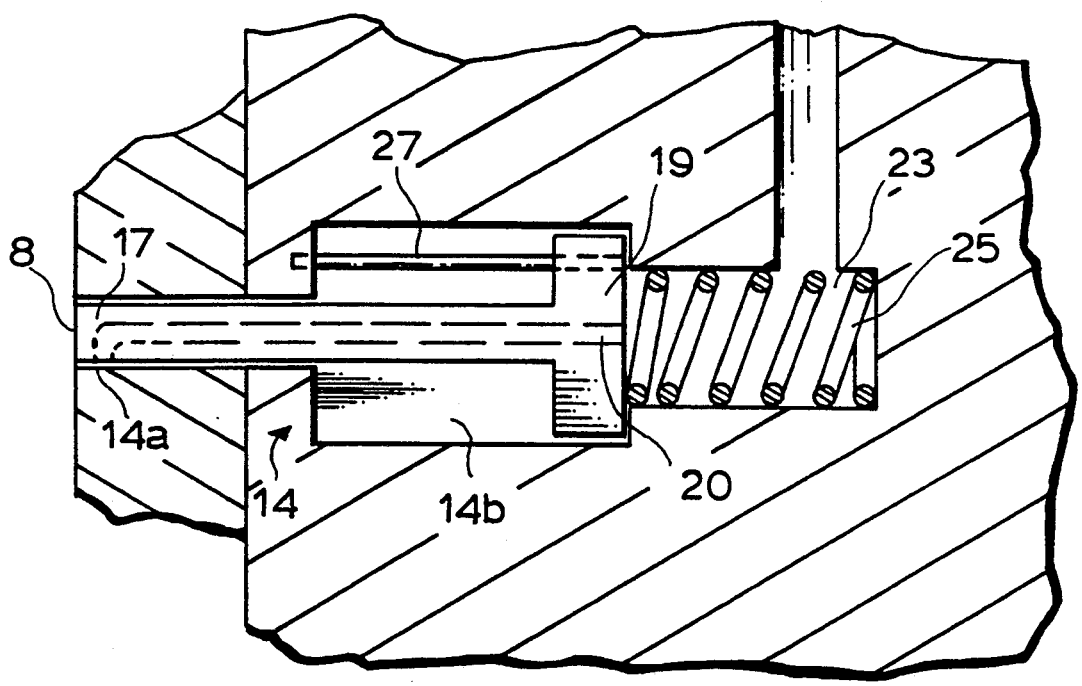
FIG. 5 is a sectional view through the pin in its recess as seen in FIG. 3 and 4 of the drawings.

The present invention also uses a blow off pin but incorporates features over and above those found in my earlier patents. To better describe the present invention, reference is had to the mold as shown in FIGS. 1 through 4 of the drawings and the pin of that mold as best shown in FIG. 5 of the drawings.

The mold generally indicated at 1 comprises a female body part 3 and a male body part 9. The male body part includes a male molding surface 11 bordered by a shut off face 13. The female body part includes a cavity molding region 5 which fits over the male molding surface when the mold is closed. Cavity 5 is bordered by surface region 7 which when the mold closes abuts with shut off face 13. In the closed position, plastic is injected into cavity 5 around molding surface 11.

When the molding operation is completed, the flow of plastic between the mold parts is shut off with surface 7 on the female mold part moving outwardly away from shut off face 13.

Provided at the shut off face, is an undercut recess 14 fitted with a reciprocable pin 15. This pin as best seen in FIGS. 3 and 4 of the drawings has an enlarged bottom portion 19 and a narrower upper portion 17. The undercut recess 14 has a similar configuration including a relatively small diameter upper region 14a and a larger diameter bottom region 14b.

Pin 15 includes a gas passage 20 extending through the bottom of the bottom pin portion and extending upwardly into the upper pin portion. However, passage 20 rather than extending right to the top opens sideways through the pin. Accordingly, the pin includes a top solid surface 18.

The side opening of the gas passage is directed at the male molding surface to assist in ejecting pieces formed on that molding surface. In order to prevent the pin from rotating away from its proper operating position, a small guide post 27 is provided within the lower region of the pin recess. The bottom portion of the pin is provided with an opening into which guide post 27 is fitted as best seen in FIG. 5 of the drawings. With this arrangement, the guide post prevents rotation of the pin while allowing the pin to reciprocate between an operating and a hidden position within the pin recess.

When the mold is in operation with the two mold parts closed relative to one another, plastic is injected by injection means, not shown and not forming part of this invention, to flow around male molding surface 11. In most cases, the mold operation is completed without excessive plastic material. However, in other instances as a result of a malfunction, there will be an over flow of plastic material known in the industry as flashing. This flashing will run onto the shut off face of the male mold part. In a system using an open gas vent, the over flow will flow down into and clog the open vent requiring substantial shut down time for cleaning of the vent.

In accordance with the present invention, vent clogging is essentially eliminated through the use of pin 15. As can be clearly seen in FIG. 3 of the drawings when the mold is closed, this pin is pushed down into the male body part of the mold by the female body part where the sideways opening of the pin vent is below the shut off face away from any plastic material flashing onto the shut off face. The top solid surface of the pin is unaffected by any such flashing plastic.

A very important feature of the present invention is the tight tolerance of the pin upper portion 17 relative to the recess upper region 14a. This tolerance is typically in a range of about 2 to 6 ten thousandths of an inch which is an extremely tight tolerance for preventing the flow of plastic down along the side edges of the pin into the pin vent.

The above noted tolerances are not however required beneath the pin vent so that moving downwardly along the pin and down to the enlarged bottom pin portion, there is an increased clearance between the pin body and the sloes of the recess. This again can be seen in FIG. 5 where there is little tolerance in the upper end of the pin and a much greater tolerance moving downwardly along the pin. In fact and unlike my earlier patented structure, the tolerance is greatest at the enlarged bottom portion of the pin. In my earlier structure, this bottom pin portion was fitted with a sealing member actually dragging along the wails of the recess to prevent the escape of air upwardly past the pin bottom other than through the gas passage. However, with the arrangement of the present invention, the pin bottom is spaced from the walls of the lower recess region. In fact, the tolerance between the upper end of the pin and the upper recess region is so tight that it not only substantially eliminates flashing down along the pin but in addition restricts sideways movement of the pin to the extent that the pin bottom will not come into contact with the outer walls of the lower recess region. Therefore, although there is drag along the upper part of the pin as it moves to its operating position, there is no drag at the bottom end of the pin. This movement to the operative or up position is best caused by means of a spring 25 beneath the enlarged bottom spring portion which provides an effective seat for the spring. Spring 25 which helps to overcome the drag as the pin is lifted, is located within a spring fittable chamber 23 of reduced diameter relative to the lower region 14b of the pin recess thereby presenting a stop surface 27 immediately beneath the pin bottom when the pin is in the down inoperative position. This stop surface prevents the pin from moving downwardly anything farther than what is shown in FIG. 5 so that the solid top surface 18 of the pin is flush with the shut off face. This assures that the pin cannot be jammed down by any potential over flow of plastic onto the shut off face which might otherwise prevent the pin from being moved back upwardly to the operative position.

When using the spring 25, the upward movement of the pin starts as soon as the mold opens allowing the spring which is compressed when the pin is in the down position to push the pin outwardly as far as permitted by the undercut configuration of the pin recess. When the pin has reached its uppermost position, the side opening vent in the pin is located at a height for an effective blow off of the piece formed on the male molding surface. This blow off is provided by gas pressure from a gas supply line 21 feeding into the spring chamber and upwardly through the gas passage 20 through the pin.

In the arrangement described above, because the spring has been used to lift the pin, the gas pressure is set according to the amount of pressure required to blow the piece off the male molding surface and not the amount of pressure required to lift the pin. Therefore, the gas pressure can be set relatively low as an assist with other gas blow off areas provided directly in the male molding surface not forming part of this invention and as described in my own earlier patent. This therefore allows a very controlled blow off of the pieces from the male molding surface.

The amount of pressure on spring 25 is set such that it does not effect closure of the mold. For example, the spring when set at about 40 pounds pressure is effective in moving the pin from the down to the up position while allowing complete closure of the mold. Most mold designs include more than one mold cavity where for example a relatively small mold having a minimum closing pressure of about 2000 pounds might have up to four mold cavities. Therefore, the total spring pressure from the four springs at these mold cavities would be somewhere around 160 pounds versus the minimum 2000 pounds closing the mold so that there is a minimum ratio of about 12.5 to 1 closing pressure versus spring pressure. In larger molds, there will be more mold cavities. However, at the same time, the closing pressure of these larger molds also increases maintaining at least the minimum 12.5 to 1 ratio.

All of the description above relates the use of the spring in raising the pin to the operating position. However, in some cases where extremely high gas pressure is desired for blowing the piece off the molding surface, the pin may be raised by this high gas pressure. Accordingly, I refer to chamber 23 as a spring fittable chamber which allows the fitting of the spring but which also allows the mold to be provided to the customers without the spring. The customer may then in turn fit the spring into chamber 23 if so desired.

Although various preferred embodiments of the invention have been described in detail, it will be appreciated by those skilled in the art that variations may be made without departing from the spirit of the invention or the scope of the appended claims.

The embodiment of the invention in which an exclusive property or privilege is claimed are defined as follows:

1. A mold with gas ejection only of pieces formed in said mold, said mold comprising a female body part and a male body part, said male body part including a male molding surface with a surrounding plastic injection shut off face and a reciprocable gas controlling blow off pin slideably trapped within a pin receiving recess at said shut off face, said pin having an enlarged bottom portion and a narrow upper portion with a gas passage starting upwardly through said bottom portion into said upper portion and opening sideways thereof with said pin having a solid top surface, said pin receiving recess being defined by a recess wall outwardly around said pin and having an undercut configuration including a small diameter upper region and a larger diameter base region with a first clearance around said narrowed upper portion of said pin in said small diameter upper region of said pin receiving recess and an second clearance around said enlarged bottom portion of said pin in said larger diameter base region of said pin receiving recess, said first clearance being only sufficient to allow movement of said upper portion of said pin while at least substantially preventing flashing of mold material into said upper region of said pin receiving recess, said second clearance being greater than said first clearance, said first clearance around said narrowed upper portion of said pin being sufficiently tight to restrict sideways movement of said pin to the extent to avoid contact between said recess wall of said base region of said pin receiving recess and said enlarged bottom portion of said pin for sliding of said pin in said recess and a spring fittable chamber beneath and opening upwardly into said pin receiving recess, said spring fittable chamber having a diameter less than said bottom portion of said pin to prevent downward movement of said pin into said spring fittable chamber.

* * * * *